United States Patent
Girard et al.

(10) Patent No.: US 9,623,363 B2
(45) Date of Patent: Apr. 18, 2017

(54) PROCESS FOR CAPTURING SULPHUR IMPURITIES USING SPECIFIC RETAINING MATERIALS

(71) Applicants: Centre National de la Recherche Scientifique, Paris (FR); IFP Energies nouvelles, Rueil-Malmaison (FR)

(72) Inventors: Vincent Girard, Ruaudin (FR); Delphine Bazer-Bachi, Irigny (FR); David Chiche, Lyons (FR); Arnaud Baudot, Vernaison (FR); Christophe Geantet, Miribel (FR)

(73) Assignees: IFP Energies nouvelles, Rueil-Malmaison (FR); Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 13/673,009

(22) Filed: Nov. 9, 2012

(65) Prior Publication Data
US 2013/0121904 A1 May 16, 2013

(30) Foreign Application Priority Data
Nov. 10, 2011 (FR) .................... 11 60296

(51) Int. Cl.
| | | |
|---|---|---|
| *B01D 53/48* | (2006.01) | |
| *B01D 53/02* | (2006.01) | |
| *B01J 20/06* | (2006.01) | |
| *B01D 53/52* | (2006.01) | |
| *C01B 3/56* | (2006.01) | |
| *C10K 1/00* | (2006.01) | |
| *C10K 1/32* | (2006.01) | |
| *B01J 20/30* | (2006.01) | |
| *B01J 20/34* | (2006.01) | |
| *B01D 53/82* | (2006.01) | |
| *B01D 53/83* | (2006.01) | |

(52) U.S. Cl.
CPC ............ *B01D 53/02* (2013.01); *B01D 53/48* (2013.01); *B01D 53/52* (2013.01); *B01J 20/06* (2013.01); *B01J 20/3007* (2013.01); *B01J 20/3014* (2013.01); *B01J 20/3078* (2013.01); *B01J 20/3433* (2013.01); *B01J 20/3458* (2013.01); *B01J 20/3491* (2013.01); *C01B 3/56* (2013.01); *C10K 1/004* (2013.01); *C10K 1/32* (2013.01); *B01D 53/82* (2013.01); *B01D 53/83* (2013.01); *B01D 2253/1124* (2013.01); *B01D 2257/306* (2013.01); *B01D 2257/308* (2013.01); *B01J 2220/42* (2013.01); *C01B 2203/0485* (2013.01)

(58) Field of Classification Search
None
See application file for complete search history.

(56) References Cited

U.S. PATENT DOCUMENTS

| 3,923,646 | A | * | 12/1975 | Hilfman .................... 208/216 R |
|---|---|---|---|---|
| 4,729,889 | A | | 3/1988 | Flytani-Stephanopoulos et al. |
| 5,252,528 | A | * | 10/1993 | Voecks et al. .................. 502/74 |
| 6,649,043 | B1 | * | 11/2003 | Chen et al. ..................... 208/213 |
| 2008/0006531 | A1 | * | 1/2008 | Holt .............................. 204/419 |
| 2011/0172468 | A1 | * | 7/2011 | Yamamoto et al. .......... 568/917 |

OTHER PUBLICATIONS

International Search Report for FR1160296 dated Jul. 13, 2012.
Edwin Suresh Raj, A. M. et al., "Zinc (II) oxide-zinc (II) molybdate composite humidity sensor," Sensors and Actuators B, 2002, vol. 81, pp. 229-236.

* cited by examiner

*Primary Examiner* — Jennifer A Smith
*Assistant Examiner* — Anita Nassiri Motlagh
(74) *Attorney, Agent, or Firm* — Millen, White, Zelano and Branigan, P.C.

(57) ABSTRACT

A process for capturing sulphur impurities present in gas feeds containing $H_2$ and/or CO:
 a. desulphurization with a retaining material containing an active phase,
 b. optionally, rendering the sulphurized retaining material inert,
 c. oxidative regeneration of the retaining material,
 d. optionally, rendering the regenerated retaining material inert, and
 e. desulphurization with the retaining material that has been regenerated and rendered inert, and regenerating the retaining material.

15 Claims, No Drawings

PROCESS FOR CAPTURING SULPHUR IMPURITIES USING SPECIFIC RETAINING MATERIALS

The present invention relates to a process for capturing sulphur impurities such as $H_2S$ and/or COS and/or $CS_2$, contained in gaseous feeds such as natural gas or synthetic gases and in particular gases containing $H_2$ and/or CO.

Sulphur impurities are present in a large number of industrial gases, such as the effluents from the Claus reaction, natural gas, synthetic gases, and hydrocarbon feeds intended for steam reforming, hydrogen production or the production of synthetic gas by controlled oxidation.

Synthetic gases, for example, are conventionally obtained by transformation of natural gas, carbon, heavy oil residues or biomass using processes such as steam reforming, autothermal reforming, partial oxidation, or also methanol decomposition. Synthetic gases can also be obtained by gasification of a mixture of biomass and/or carbon and/or oil residues (synthetic gas obtained by co-processing). These synthetic gases more often than not comprise carbon monoxide, hydrogen, water vapour and carbon dioxide. According to the nature of the feed from which they have been obtained, the synthetic gases can contain different levels of sulphur impurities such as $H_2S$ and/or COS and/or $CS_2$.

In Fischer-Tropsch synthesis processes, these impurities are liable to poison the catalysts used. Furthermore, the sulphur compounds can reduce the performances of the materials used in the fuel cells. Finally, the sulphur impurities present in industrial gases, and in particular synthetic gases, may cause a certain number of problems when these gases are used.

In fact, when they are employed, for example, in gas turbines in integrated gasification combined cycle (IGCC) units, the sulphur impurities can cause accelerated corrosion of the installations. Furthermore, the gases produced by a cogeneration plant must also meet quite particular specifications which are linked to the processes downstream or environmental constraints.

In this respect, the requirements in terms of the purity of the gases are very strict. Some applications, such as for example the Fischer-Tropsch synthesis, require contents of $H_2S$ that are generally lower than 10 ppb by weight.

The use of a solid that absorbs $H_2S$ (or retaining material) is one of the methods commonly employed to remove sulphur impurities from gas feeds. According to this method, the impurities to be eliminated interact chemically with the metal oxides contained in the retaining material to form sulphides. The solids used as a retaining material include solids with a copper, zinc, magnesium, iron or manganese base. Alumina and silica can also be used as a support or binding agent.

During processes to remove the sulphurous compounds present in gaseous feeds, these solids form sulphides and progressively lose their properties. As a result it is necessary, on the one hand, to use large quantities of absorbent solids—which is costly and requires oversized installations—and, on the other, to regenerate the sulphurised solids.

Regeneration can take place in-situ or ex-situ. Ex-situ it poses technical problems for the continuity of the desulphurisation process since the solid has to be removed from the reactor in order to be recycled. In-situ, the regeneration must be performed oxidatively, by bringing the sulphide solid into contact with a gas containing oxygen. The oxygen interacts chemically with the sulphide metal oxides of the retaining material used in order to reform metal oxides.

U.S. Pat. No. 4,729,889 describes, for example, $H_2S$ retaining materials that can be regenerated and can be used in high temperature desulphurisation reactions. These retaining materials comprise binary metal oxide phases which are characterised in that they form a eutectic at the desulphurisation temperature. So, the binary metal oxides phase melts during the desulphurisation reaction (at around 700° C.) in such a way as to favour absorption of $H_2S$.

U.S. Pat. No. 5,252,528, for its part, proposes other regenerable $H_2S$ retaining materials that can be used in high-temperature desulphurisation reactions. These retaining materials comprise between 1 and 20% by weight of binary metal oxide phase and are regenerable at temperatures of between 550 and 700° C.

However, these retaining materials are not suitable for the more modern desulphurisation processes, which are operated in particular at temperatures of less than 450° C. since the difference in temperatures between the desulphurisation reaction and the regeneration reaction is too great. This temperature difference in fact has a negative impact on the overall energy efficiency of the process.

As a result, there is a need for gas feed desulphurisation processes performed at a moderate temperature, in particular at less than 450° C., using retaining materials that are easy to regenerate in-situ.

The applicant has discovered that it is possible to use such a process by employing specific retaining materials that can be regenerated at temperatures of between 300 and 600° C.

So, the subject matter of the invention, according to a first aspect, is a process for capturing sulphur impurities, such as $H_2S$ and/or COS and/or $CS_2$, present in gas feeds such as natural gas or synthetic gases, and in particular gases containing $H_2$ and/or CO, comprising:

a. desulphurisation by bringing the feed to be treated into contact, at a temperature of between 20 and 450° C., with a retaining material containing an active phase comprising:
   at least one oxide of at least one metal (I) from the group VIIb, VIIIb, Ib, or IIb, and
   at least one oxide of at least one metal (II) selected from the group consisting of Cr, Mo, W, and the rare earths such as Pr, Nd, Ce,
   with the molar ratio between the metal (I) and the metal (II) ranging from 0.6 to 20,
b. optionally, rendering the sulphurised retaining material inert,
c. oxidative regeneration of said retaining material,
d. optionally, rendering the regenerated retaining material inert, and
e. desulphurisation by bringing the feed to be treated into contact, at a temperature of between 20 and 450° C., with said retaining material that has been regenerated and rendered inert, said retaining material having been regenerated at a temperature of between 20 and 600° C., preferably of between 250 and 550° C. and more preferably of between 300 and 480° C.

The subject-matter of the invention is also a material for capturing sulphur impurities, such as $H_2S$ and/or COS and/or $CS_2$, containing an active phase of formula $A_xB_yO_z$, in which;

A is a metal (I) from the group VIIb, VIIIb, IB or IIb, and
B is a metal (II) selected from the group consisting of Cr, Mo, W and the rare earths such as Pr, Nd, Ce,
said active phase also comprising optionally an oxide of the metal (I) of formula $A_tO_u$, in which the molar ratio between the elements A and B, that is to say the ratio (x+t):y, varies between 0.6 and 20.

Finally the subject matter of the invention, according to a third aspect, is the use of a material as defined above for the desulphurisation of gas feeds such as natural gas or synthetic gases, and in particular gases containing $H_2$ and/or CO.

Gas Feed

The process according to the invention can be used to purify all gas feeds containing, inter alia, sulphur compounds such as $H_2S$ and/or COS and/or $CS_2$.

The gas feeds that can be treated by the process according to the invention include synthetic gases containing $H_2$ and/or CO, and possibly natural gases.

According to a preferred embodiment, the feeds treated by the process according to the invention are synthetic gases containing $H_2$ and/or CO.

Application of the Process

The process according to the invention can, for example, be used to purify gas feeds used in cogeneration plants (such as IGCC power stations), in chemical synthesis units such as those for the synthesis of methanol, or Fischer-Tropsch synthesis units.

The desulphurisation can be implemented in various types of reactors, such as for example a fixed bed or circulating bed reactor, a radial reactor, or a fluidised bed reactor.

In the case of fixed bed reactor, radial reactor or fluidised bed reactor technologies, a number of reactors may in fact be linked together and operate in parallel.

According to this type of application, the reactors can function in an alternate manner or also out of phase, such that one or a plurality of reactors may be used to desulphurise the feed to be treated, while one or a plurality of reactors are in the phase of rendering inert and/or regenerating the retaining material already used during a previous desulphurisation step. In this mode of operation, the process according to the invention is always operational in order to perform desulphurisation of the feed to be treated.

In applications that use circulating bed type reactors, at least two reactors can be linked in the following manner. The active retaining material, that is to say containing metal oxides, is introduced into the bottom of a vertical tubular reactor No 1 with a gas feed to be cleaned up. The desulphurisation step of the gas feed takes place in reactor No 1.

The upward flow of the gas feed to be cleaned up is selected in such a way as to convey and evacuate the retaining material towards the top of the reactor. The top outlet of the reactor is equipped with a system that allows separation of the retaining material from the desulphurised gas.

Equipment that uses gravitational solid/gas separation is preferred, in particular those with cyclone type separation geometries.

The sulphurised retaining material then drops by gravity into a second tubular reactor in which the regeneration of the retaining material takes place. The circulation of the regeneration solid and fluid containing oxygen in the regeneration reactor is performed in an upward or gravitational manner.

The direction of circulation of the fluid as a function of the solid can be co-current (when the direction of circulation is upwards, for example) or counter-current (if the direction of circulation of the solid is gravitational, for example).

The regenerated retaining material is then separated from the regeneration gas depleted of oxygen by means of solid/gas separation. The retaining material is then reintroduced into the desulphurisation reactor as described above.

The operating conditions for the desulphurisation step or the regeneration step are identical to those developed in the description.

Desulphurisation

The first step in the process according to the invention consists of desulphurisation (or purification) of the gas feed to be treated, by bringing the gas feed to be treated in contact with said retaining material in a reactor.

The desulphurisation step is performed by bringing the feed to be treated into contact, at a temperature of between 20 and 450° C., with a retaining material containing an active phase comprising:
  at least one oxide of at least one metal (I) from the group VIIb, VIIIb, Ib, or IIb, and
  at least one oxide of at least one metal (II) selected from the group consisting of Cr, Mo, W, and the rare earths such as Pr, Nd, Ce,
with the molar ratio between the metal (I) and the metal (II) ranging from 0.6 to 20.

According to a preferred embodiment, the desulphurisation of the feed to be treated is carried out at a temperature of between 50 and 450° C., preferably of between 100 and 350° C.

Furthermore, the desulphurisation of the feed can be carried out at a pressure of between 1 and 250 bar, preferably of between 10 and 150 bar, and more preferably of between 15 and 80 bar.

In this step, the feed is advantageously introduced into the reactor at an hourly volume rate (HVR, expressed as the ratio of the actual gas delivery under process operating conditions to the volume of the reactor) of between 100 and 20 000 $h^{-1}$, preferably of between 200 and 5 000 $h^{-1}$, and more preferably of between 300 and 3 000 $h^{-1}$.

According to a particular embodiment, when the process according to the invention is used to purify the feed of a Fischer-Tropsch synthesis unit, the desulphurisation step of the synthetic gas is preferably performed at a pressure of between 10 and 100 bar, and at a temperature of between 100 and 280° C.

According to another embodiment, in the context of methanol synthesis, the desulphurisation step is generally carried out at a pressure of between 10 and 150 bar, preferably of between 50 and 100 bar and at a temperature of between 150 and 300° C., preferably of between 220 and 280° C.

Finally, according to a further embodiment again, when the process according to the invention is used in a cogeneration plant, the desulphurisation step is generally carried out at a pressure of between 1 and 150 bar, preferably of between 15 and 50 bar, at a temperature of between 150° C. and 450° C., preferably of between 170 and 350° C.

Regeneration of the Retaining Material

The process according to the invention also comprises an oxidative regeneration step of the sulphurised retaining material at a temperature of between 20 and 600° C., preferably of between 250 and 550° C., and more preferably of between 300 and 530° C., or even of between 300 and 480° C. and more particularly of between 300 and 450° C.

The regeneration step can in particular be applied by bringing the sulphurised solid into contact with a gas containing oxygen.

According to a particular embodiment, the regeneration gas contains between 0.5 and 20% by volume, preferably between 2.5 and 20% by volume, more preferably between 5 and 20% by volume, of oxygen.

The regeneration step is preferably applied at a pressure of between 0.1 and 10 bar, preferably of between 0.1 and 5 bar, more preferably of between 1 and 3 bar.

In this step, the regeneration gas is advantageously introduced into the reactor at an hourly volume rate (HVR, expressed as the ratio of the actual gas delivery under process operating conditions to the volume of the reactor) of between 100 and 20 000 $h^{-1}$, preferably between 200 and 5 000 $h^{-1}$, and more preferably of between 300 and 3 000 $h^{-1}$.

Rendering Inert

The process according to the invention can further comprise a step for rendering the sulphurised retaining material inert following the desulphurisation step, or of the regenerated retaining material following the regeneration step.

In fact, once the desulphurisation or regeneration steps are complete, the absorbent material can be rendered inert by bringing the retaining material into contact with an insert gas, preferably nitrogen, in particular at a pressure of between 0.1 and 10 bar, preferably of between 0.5 and 3 bar.

This step can in particular be applied by passing an inert gas (for example nitrogen) through the reactor preferably at a temperature that falls within the range of temperatures at which the desulphurisation and regeneration steps are applied.

The steps for rendering inert can in particular be applied in fixed bed, radial or fluidised bed reactors, but are in particular superfluous when the reaction is conducted in reactors using the circulating bed type technology.

Retaining Material

The process for capturing sulphur impurities according to the invention uses a retaining material comprising an active phase comprising:
at least one oxide of at least one metal (I) from the group VIIb, VIIIb, Ib, or IIb, and
at least one oxide of at least one metal (II) selected from the group consisting of Cr, Mo, W, and the rare earths such as Pr, Nd, Ce,
with the molar ratio between the metal (I) and the metal (II) ranging from 0.6 to 20.

In fact, it is noteworthy that the applicant has demonstrated that these retaining materials, comprising an oxide phase having a specific molar ratio of the metal (I) and the metal (II), have first-rate abilities to capture sulphur impurities (in particular $H_2S$) at moderate temperatures, in particular lower than 450° C., and are able to be regenerated at very low temperatures (of between 20 and 600° C., preferably of between 250 and 550° C., and more preferably of between 300 and 480° C.)

According to a preferred embodiment, the retaining materials according to the invention contain an active phase comprising a mixed oxide of at least
one metal (I) from the group VIIb, VIIIb, Ib, or IIb, and
one metal (II) selected from the group consisting of Cr, Mo, W, and the rare earths such as Pr, Nd, Ce,
said active phase also optionally comprising an oxide of the metal (I)
in which the molar ratio between the metal (I) and the metal (II) ranges from 0.6 to 20.

The mixed oxide is characterised by the appearance of a spinel, perovskite or any other integrating type phase in the form of a solid solution of metals (I) and (II).

The nature of the oxide phase can be characterised by prior art methods, and in particular X-ray diffraction. The determination of the nature of the crystalline phases (simple or mixed), can be performed by comparison of the experimental diffractograms with the files in the X-ray diffraction diagram databases of the ICDD (International Centre for Diffraction Data).

Specifically, these retaining materials according to the invention in particular allow absorption of sulphur compounds, and in particular $H_2S$ more effectively than retaining materials containing a simple oxide phase consisting of either metals (I) or metals (II). They can also be regenerated at lower temperatures, thereby significantly reducing the difference in temperature between the desulphurisation reaction and the regeneration reaction, thereby contributing to improved energy efficiency of the desulphurisation process.

According to a particularly preferred embodiment, the molar ratio between the metal (I) and the metal (II) of the retaining material according to the invention is between 1 and 10, preferably between 1 and 5, and more preferably between 1 and 2.

Numerous methods allowing metal oxides (I) from the group VIIb, VIIIb, Ib and IIb to be obtained are described in the literature, such as for example by decomposition of the metallic precursors, by sol-gel methods, by precipitation in aqueous media, by using complexing methods, synthesis by self-combustion, or by Pechini processes. These oxides may also be of commercial origin.

The metal (I) of the retaining material is, preferably, selected from the group consisting of zinc, copper, and iron, preferably zinc.

The zinc oxide can, for example, be obtained commercially and may be the result of two large-scale manufacturing processes: the indirect (or French) process and the direct (or American) process.

Initially preferred, the French process consists, essentially, of heating the zinc to near its boiling point. The vapours thereby generated are oxidised by combustion in the air. The zinc bloom is aspirated by fans and sent into large chambers where the particles are graded by means of partitions according to their size. This process leads to products of very high purity, the quality of which depends only on the initial purity of the metal.

The direct process dates back to 1852 (The New Jersey Zinc Company). In this case, the raw material is zinc ore, that is to say often sulphides, carbonates or silicates of zinc. This ore, mixed with carbon, is fed into a furnace through which a current of air circulates. The heat resulting from the combustion of the carbon allows a reduction of the ore and volatilisation of the zinc. These vapours are then oxidised by carbon dioxide or saturation with oxygen. As with the French process, the oxide fumes are aspirated and sent to large spaces in order to recover the particles graded by size. Although more economical, this process nevertheless results in a lower purity zinc.

Numerous other preparation methods are described in the literature, for example by dehydration of zinc hydroxide obtained by precipitation, by decomposition of the various zinc precursors, either obtained commercially or by preliminary precipitation.

The metal (II) of the retaining material is in particular selected from the group consisting of Cr, Mo, W and the rare earths such as Pr, Nd, Ce and preferably molybdenum.

The retaining material can in particular be prepared using simple oxides of the metals (I) and (II).

Alternatively, the retaining material according to the invention can also be obtained from a mixed oxide comprising an oxide of at least one metal (I) from group VIIb, VIIIb, Ib or IIB, and preferably zinc, and an oxide of at least one metal (II) selected from the group consisting of Cr, Mo, W and the rare earths such as Pr, Nd, Ce and preferably molybdenum.

Numerous methods allowing these mixed oxides to be obtained are described in the literature, such as for example by decomposition of the metallic precursors, by mixing and calcination of the corresponding simple oxides, by grinding and calcination of the corresponding simple oxides, by sol-gel methods, by precipitation in aqueous medium, by using complexing methods, synthesis by self-combustion, or by Pechini processes. These oxides may also be of commercial origin.

According to a particularly preferred embodiment, the metal (I) of the retaining material is zinc and the metal (II) of the retaining material is molybdenum.

The subject matter of the invention, according to another aspect, is a material for capturing sulphur impurities, such as $H_2S$ and/or COS and/or $CS_2$, containing an active phase of formula $A_xB_yO_z$, in which;

A is a metal (I) from the group VIIb, VIIIb, IB or IIb, and
B is a metal (II) selected from the group consisting of Cr, Mo, W and the rare earths such as Pr, Nd, Ce,
said active phase also comprising optionally an oxide of the metal (I) of formula $AtOu$, in which the molar ratio between the elements A and B, that is to say the ratio (x+t):y, varies between 0.6 and 20.

According to a preferred embodiment, the active phase comprises the mixed oxide $ZnMoO_4$, and possibly also an oxide of a metal (I) from the group VIIb, VIIIb, Ib, or IIb with the notation $A_tO_u$, such that the molar ratio (zinc+element A):molybdenum is between 0.6 and 20, that is to say such that (1+t) is between 0.6 and 20.

According to a particularly preferred embodiment, the active phase comprises the mixed oxide $ZnMoO_4$, and possibly also a zinc oxide, such that the molar ratio of zinc:molybdenum is between 0.6 and 20, preferably between 1 and 10, more preferably between 1 and 5, and more preferably still between 1 and 2.

The active phase of the retaining material can, for example, represent between 30 and 100% by weight, in relation to the total weight of the retaining material, preferably between 40 and 95% by weight, and more preferably between 50 and 90% by weight. The fact of containing a content of active phase in excess of 30% by weight, preferably in excess of 40% by weight, or even in excess of 50% by weight, in relation to the total weight of the retaining material, allows the regeneration to be facilitated within a relatively low temperature range as defined according to the invention. Actually, the fact of having a high content (that is to say a content in excess of 30% by weight, preferably in excess of 40% by weight, or even in excess of 50% by weight) in the active phase allows concentration of the exothermic effect of the regeneration by oxidation on the retaining material according to the invention, and thus a reduction in the regeneration temperature.

When the active phase does not represent 100% of the retaining material, the latter can in particular comprise at least a mineral filler that serves as a binding agent or support, in order to facilitate its forming, and to provide it with good mechanical resistance.

This mineral filler can in particular be an alumina or an alumina precursor, silica, a silica-alumina, a clay (bentonite, kaolinite, montmorillonite or smectite), a zirconium or a titanium oxide.

The mineral filler is preferably an alumina, more preferably an alpha-alumina, and/or a clay (bentonite, kaolinite, montmorillonite or smectite), for example Provins clay.

It will also be possible to advantageously use an organic adjuvant (eliminated at the retaining material calcination step) such as cellulose derivatives, polyethylene glycols, monocarboxylic aliphatic acids, alkylated aromatic compounds, sulphonic acid salts, fatty acids, pyridine polyvinyl, polyvinyl alcohol, methyl cellulose and other additives known to a person skilled in the art.

The mineral filler can be present in the retaining material with a content of between 0.1 and 70% by weight, preferably of between 5 and 60% by weight, and more preferably of between 10 and 50% by weight, in relation to the total weight of the solid.

The retaining material can, furthermore, take the form of granules, compacts, extrudates, balls or monoliths.

Preparation of the Retaining Material

The retaining materials according to the invention can be formed by any of the techniques commonly used and allowing binary mixed oxides or mixtures of simple oxides to be obtained such as extrusion, pelleting, granulation or atomisation, etc.

According to a particularly preferred aspect of the invention, the retaining materials can be obtained by a process of co-mixing oxides and then extrusion comprising the following steps:

a. pre-mixing the two simple oxides or the mixed oxide or their precursors in powder form, in a molar ratio of the metal (I) and the metal (II) of between 0.6 and 20;
b. optionally, addition of a mineral filler, for example selected from among alumina, clays, silica, titanium oxide, with a content of between 0.1 and 70% by weight, preferably of between 5 and 60% by weight, and more preferably of between 10 and 50% by weight, in relation to the total weight of the solid;
c. preparation of a paste by bringing the pre-mixed powders into contact with a solution possibly containing an acidic or basic peptising agent, leading to a paste being obtained (peptisation);
d. mixing of the paste obtained in this way;
e. extruding the paste at a pressure of between 3 and 10 Mpa;
f. drying the extrudates obtained in step c) at a temperature of between 70 and 160° C. for a period of between 1 and 24 hours;
g. calcination of the dried extrudates at a temperature of between 200 and 800° C. for a period of between 1 and 6 hours, under a flow of gas containing oxygen.

The acid or basic peptising agent used in step c enables in particular promotion of the redispersion of the powders.

It will be advantageously possible to replace the mixing and extrusion steps by a compacting or granulation step or any method known to a person skilled in the art allowing the generation of items with millimetric dimensions (for example of between 0.8 and 4 mm, preferably of between 1 and 3 mm), from the pre-mixing of powders of step a).

According to another embodiment, the retaining materials can be obtained by a process of mixing and extrusion from an oxide and a precursor in solution of at least one metal (II) oxide, comprising the following steps:

a. pre-mixing an oxide of at least one metal (I) from the group VIIb, VIIIb, Ib or IIb, and a precursor of at least one oxide of at least one metal (II) selected from the group consisting of Cr, Mo, W and the rare earths such as Pr, Nd, Ce in a molar ratio between the metal (I) and the metal (II) of between 0.6 and 20;
b. optionally, addition of a mineral filler, for example selected from among alumina, clays, silica and titanium oxide, with a content of between 0.1 and 70% by weight, preferably of between 5 and 60% by weight, and more preferably between 10 and 50% by weight, in relation to the total weight of the solid;
c. preparation of a paste by bringing the pre-mixed powders into contact with a solution possibly containing an acid or basic peptising agent leading to the obtaining of a paste (peptisation);
d. mixing the paste obtained in this way;
e. extruding the paste at a pressure of between 3 and 10 MPa;
f. drying the extrudates obtained in step e) at a temperature of between 70 and 160° C. for a period of between 1 and 24 hours;
g. calcination of the dried extrudates at a temperature of between 200 and 800° C. for a period of between 1 and 6 hours, under a flow of gas containing oxygen.

In this process, the metallic (II) precursor can be added not in powder form but after dispersion or solubilisation of the solution used in step c.

It will be advantageously possible to use this mode of operation to prepare a retaining material according to the invention from a metal (II) oxide and a zinc oxides precursor.

According another embodiment again, the retaining materials can be obtained by another process comprising the following steps:
a. forming an oxide of at least one metal (I) from the group VIIb, VIIIb, Ib or IIb (by pelleting, mixing, extrusion, granulation, etc.), preferably ZnO, in such a way as to obtain grains with millimetric dimensions (for example of between 0.8 and 4 mm, preferably of between 1 and 3 mm), or use of an oxide of at least one metal (I) from the group VIIb, VIIIb, Ib or IIb in the form of a grain with a size and resistance compatible with use in a fixed bed reactor;
b. impregnation of a precursor with at least one metal (II) selected from the group consisting of Cr, Mo, W and the rare earths such as Pr, Nd, Ce and preferably Mo, on the metal (I) oxide support in a molar ratio of the metal (I) to the metal (II) of between 0.6 and 20;
c. maturation;
d. drying at a temperature of between 80 and 200° C., preferably of between 80 and 120° C.;
e. calcination at a temperature of between 300 and 800° C., preferably of between 400 and 600° C. and more preferably of between 400 and 550° C.

The maturation can, for example, be carried out at ambient temperature for between 6 and 48 hours, preferably between 12 and 24 hours, in a hermetically sealed enclosure.

Another preferred mode of operation consists of impregnation on an inert support (of an alumina, zirconium, silica or silica-alumina or titanium oxide type) of a mixture of precursors of the metal (I) from the group VIIb, VIIIb, Ib or IIb (preferably Zn) and precursors of the metal (II) selected from the group consisting of Cr, Mo, W and the rare earths such as Pr, Nd and Ce (preferably Mo).

Uses

According to another aspect, the subject matter of the invention is the use of a material for capturing sulphur impurities, such as $H_2S$ and/or COS and/or $CS_2$, containing an active phase of formula $A_xB_yO_z$, in which;
A is a metal (I) from the group VIIb, VIIIb, IB or IIb, and
B is a metal (II) selected from the group consisting of Cr, Mo, W and the rare earths such as Pr, Nd, Ce, said active phase also comprising optionally an oxide of the metal (I) of formula $A_tO_u$,
in which the molar ratio between the elements A and B, that is to say the ratio (x+t):y, varies between 0.6 and 20, for the desulphurisation of gas feeds such as of natural gas or synthetic gas, and more particularly gases containing $H_2$ and/or CO.

The invention is illustrated in more detail in but without being limited to the following example.

EXAMPLE

Three retaining materials were prepared:
a first, M1, for comparison, containing an active phase comprising a simple oxide ZnO;
a second, M2, according to the invention, containing an active phase comprising a mixture of simple oxides ZnO—MoO3;
a third, M3, according to the invention, containing an active phase comprising a mixed oxide ZnMoO4.

Preparation of the First Retaining Material M1 (for Comparison)

A zinc oxide was prepared by thermal decomposition of a commercially obtained zinc carbonate $(ZnCO_3)_2.(Zn(OH)_2)_3$ (Aldrich, purity>58% Zn).

To this end the precursor $(ZnCO_3)_2.(Zn(OH)_2)_3$ was placed in a porcelain boat and then heated in an muffle furnace under air. The temperature gradient was 4° C./minute, up to a level of 500° C. for 2 hours.

This is how the first retaining material M1 (comparative) was obtained.

Preparation of the Second Retaining Material M2, according to the Invention

A zinc oxide was prepared in the same manner as the retaining material M1.

A commercially available molybdenum oxide (Sigma-Aldrich, purity≥99.5%) was also used for the preparation of the second retaining material.

The two simple oxides mentioned above were physically mixed (ground) in order to obtain an equimolar mixture of simple oxides $ZnO$—$MoO_3$ (ratio of Zn:Mo=1).

This is how the second retaining material M2 (according to the invention) was obtained.

Preparation of the Third Retaining Material M3

A zinc oxide was prepared in the same manner as the retaining material M1, and a commercially available molybdenum oxide (Sigma-Aldrich, purity 99.5%) as used for the preparation of the retaining material M2 was selected.

Three grinding cycles were performed followed by calcination under air at 500° C. for 8 hours of the equimolar mixture of the $ZnO$—$MoO_3$ oxides in order to obtain a mixed oxide $ZnMoO_4$.

All the solids of the example (ZnO, $ZnO$—$MoO_3$ and $ZnMoO_4$) were characterised by X-ray diffraction, and the determination of the crystalline phases was performed by comparison of the experimental diffractograms with the files in the X-ray diffraction diagram databases of the ICDD (International Centre for Diffraction Data). In the case of the solids of the example, the files numbers that were able to be used for these characterisations were, for example, as follows: 01-070-8070 (ZnO), 04-012-8070 ($MoO_3$) and 01-070-5387 ($ZnMoO_4$).

Each solid was assessed on a thermogravimetry test bed (sulphurisation and regeneration steps). The sulphurisation was performed using a gas consisting of 0.9% by volume of $H_2S$ in $H_2$, at a temperature of 350° C., following a rise in temperature of 10° C./minute, under inert gas (HE), and a pressure of 1 bar.

For each solid, the regeneration is performed using a gas consisting of 5% by volume of $O_2$ in nitrogen, at temperatures of between 450 and 650° C., and a pressure of 1 bar. The regeneration was carried out for 1 hour.

Following a first regeneration, each retaining material is assessed a second time according to the sulphurisation procedure described in step 1.

For each solid, a quantification of the content of sulphur by elementary analysis (combustion of the solid at 900° C. and chromatographic analysis of the $SO_2$ formed) following each of the three steps (first sulphurisation, regeneration, second sulphurisation) was performed.

Table 1 shows the measured values for the three retaining materials in the example, after each step, and as a function of the regeneration temperature.

TABLE 1

Change in sulphur content following the various steps of the example.

| Retaining material | Sulphur content (% by weight) after the first desulphurisation performed at 350° C. | Regeneration temperature (° C.) | Sulphur content (% by weight) after the first regeneration | Sulphur content (% by weight) after the second desulphurisation performed at 350° C. |
|---|---|---|---|---|
| M1 | 31.1 | 480 | 31.1 | — |
|  |  | 625 | 0.2 | 30.8 |
| M2 | 14.3 | 480 | 0.1 | 14.2 |
| M3 | 15.3 | 450 | 0.04 | 14.9 |

These results show that under the conditions of the example, the regeneration of the M1 retaining material is only possible at a temperature of greater than or equal to 625° C.

The regeneration of M2, for its part, was possible at a temperature of 480° C.

Finally, it was possible to regenerate M3 from 450° C. upwards.

The analyses performed on M1, M2 and M3 after the second sulphurisation show that the solids, once they have been regenerated, can again be used in a desulphurisation process.

The invention claimed is:

1. A process for capturing sulphur impurities, present in gas feeds containing $H_2$ and/or CO, consisting of:
   a. desulfurization by bringing the feed to be treated into contact, at a temperature of between 20 and 450° C., with a retaining material containing an active phase consisting of:
   $ZnMoO_4$
   b. optionally, rendering the sulfurized retaining material inert,
   c. oxidative regeneration of said retaining material,
   d. optionally, rendering the regenerated retaining material inert, and
   e. desulfurization by bringing the feed to be treated into contact, at a temperature of between 20 and 450° C., with said retaining material that has been regenerated and rendered inert,
   said retaining material having been regenerated at a temperature of between 20 and 600° C.

2. The process according to claim 1, wherein the retaining material is regenerated at a temperature of 300° C.-400° C.

3. The process according to claim 1, wherein the oxidative regeneration is performed at a temperature of 300-480° C.

4. The process according to claim 1, wherein the desulfurization of the feed to be treated by bringing said feed into contact with the retaining material is performed at a temperature of between 50 and 450° C.

5. The process according to claim 1, wherein the desulfurization of the feed to be treated by bringing said feed into contact with the retaining material is performed at a pressure of between 1 and 250 bar.

6. The process according to claim 1, wherein the desulfurization of the feed to be treated by bringing said feed into contact with the retaining material is performed at an hourly volume rate (HVR) of between 100 and 20 000 $h^{-1}$.

7. The process according to claim 1, wherein rendering the retaining material inert is performed by bringing the retaining material into contact with an inert gas, at a pressure of between 0.1 and 10 bar.

8. The process according to claim 1, wherein the oxidative regeneration consists of bringing the retaining material to be regenerated into contact with a gas containing oxygen ($O_2$) with a content of between 0.5 and 20% by volume of $O_2$.

9. The process according to claim 1, wherein the oxidative regeneration is performed at a pressure of between 0.1 and 10 bar.

10. The process according to claim 1, wherein the oxidative regeneration is performed at an hourly volume rate (HVR) of between 100 and 20 000 $h^{-1}$.

11. The process according to claim 1, wherein the active phase represents between 30 and 100% by weight, in relation to the total weight of the retaining material.

12. The process according to claim 1, wherein the retaining material comprises, apart from the active phase, at least one mineral filler that is an alumina, an alumina precursor, silica, a silica-alumina, a bentonite clay, a kaolinite clay, a montmorillonite clay, a smectite clay, zirconium oxide or titanium oxide.

13. The process according to claim 12, wherein the mineral filler is an alpha-alumina, a bentonite clay, a kaolinite clay, a montmorillonite clay, a smectite clay or a mixture thereof.

14. The process according to claim 12, wherein the mineral filler is present in the retaining material with a content of between 0.1 and 70% by weight in relation to the total solid weight of the retaining material.

15. The process according to claim 1, wherein the retaining material is present in the form of granules, compacts, extrudates, balls or monoliths.

* * * * *